United States Patent
Gullickson

(10) Patent No.: US 7,011,354 B1
(45) Date of Patent: Mar. 14, 2006

(54) MAGNETICALLY MOUNTED VERTICALLY ADJUSTABLE AUTOMOBILE HEADLIGHT GLARE VISOR

(76) Inventor: Roy Gullickson, P.O. Box 35, Barons Alberta (CA) T0L 0G0

( * ) Notice: Subject to any disclaimer, the term of this patent is extended or adjusted under 35 U.S.C. 154(b) by 0 days.

(21) Appl. No.: 11/160,608

(22) Filed: Jun. 30, 2005

(51) Int. Cl.
*B60J 3/02* (2006.01)

(52) U.S. Cl. .................................. 296/97.11; 296/97.9
(58) Field of Classification Search ............. 296/97.1, 296/97.2, 97.5, 97.7, 97.9, 97.11, 97.12
See application file for complete search history.

(56) References Cited

U.S. PATENT DOCUMENTS

| | | | | |
|---|---|---|---|---|
| 2,603,530 A | * | 7/1952 | Jones | 296/97.6 |
| 4,317,589 A | * | 3/1982 | Kuss | 296/97.6 |
| 4,351,557 A | * | 9/1982 | Chary | 296/97.7 |
| 5,466,029 A | * | 11/1995 | Zetterlund | 296/97.8 |

* cited by examiner

*Primary Examiner*—Joseph D. Pape
(74) *Attorney, Agent, or Firm*—Bennett Jones LLP

(57) ABSTRACT

A translucent auxiliary visor, particularly for protecting the driver of an automobile from the glare of oncoming traffic, is magnetically mounted such that convenient removal and vertical adjustment is facilitated.

8 Claims, 1 Drawing Sheet

MAGNETICALLY MOUNTED VERTICALLY ADJUSTABLE AUTOMOBILE HEADLIGHT GLARE VISOR

FIELD OF THE INVENTION

The invention relates generally to devices that protect the driver of an automobile from the glare of sunlight or the headlights of oncoming traffic.

BACKGROUND OF THE INVENTION

Conventionally, in an automobile, protection from sunlight is afforded by an opaque sun visor. Due to the inherent limitations of opaque sun visors, transparent auxiliary visors are already known to provide complementary protection, particularly from the headlights of oncoming cars. However, these prior art devices suffer from disadvantages or limitations known to those skilled in the art. In particular, the prior art devices are not conveniently mountable, demountable and adjustable while driving.

Therefore, there is a need in the art for a device which may mitigate the disadvantages or limitation of prior art devices.

SUMMARY OF INVENTION

The present invention relates to an auxiliary automobile glare visor that allows convenient adjustment of the vertical height and allows for convenient removal of the visor when not in use.

In one embodiment, the invention comprises an elongate magnetic base member with its long axis oriented parallel to the A-pillar of an automobile. The base member is preferably rectangular. A visor support member is magnetically attached to the base member and may be moved lengthwise along the base member. A glare visor may be attached directly to the support member, or by means of an adjustable arm.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE PREFERRED EMBODIMENT

Figure 1:
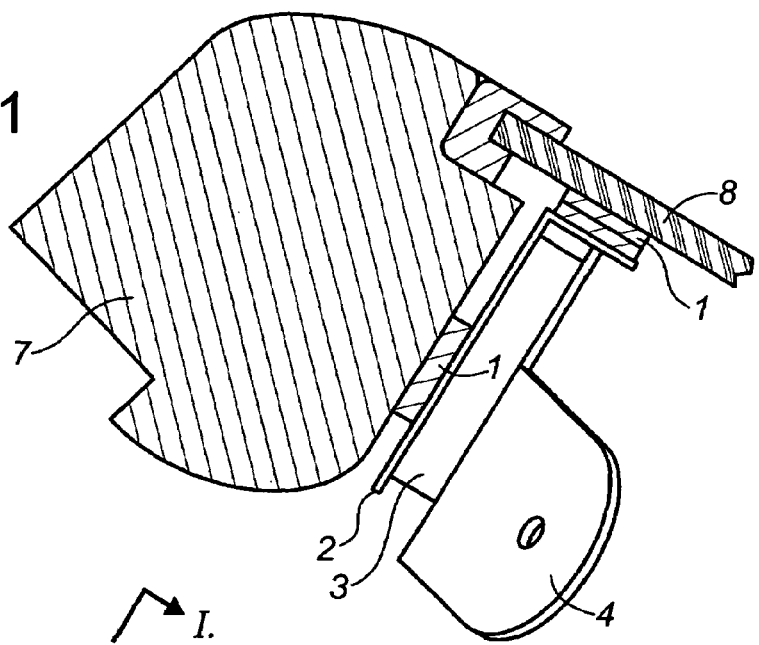
FIG. 1 is a view showing a cross-section of the driver's side A-pillar of an automobile and an embodiment of the present invention.
Figure 2:
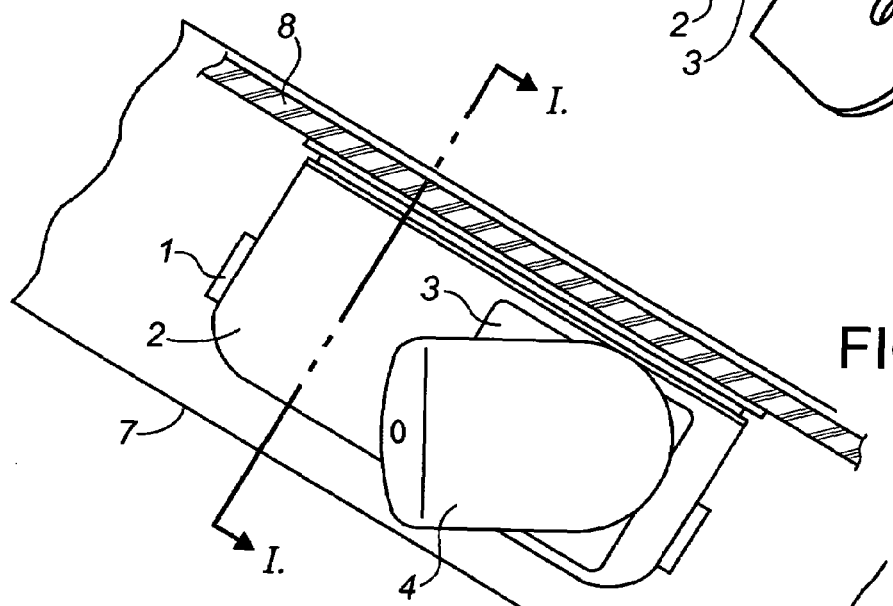
FIG. 2 is a side view of magnetic mount for auxiliary visor affixed to the driver's side A-pillar.

As may be seen in the Figures, an elongate base member (2) is attached to one or both of the A-pillar (7) of a vehicle and the windshield (8). Preferably, the base member is substantially rectangular and may include two planar sections which are substantially perpendicular to each other, one of which attaches to or abuts the A-pillar and the other which attaches to or abuts the windshield. Attachment means (1), which may comprise an adhesive material, suction cup or a hook and loop strip (Velcro™) affixes a base member (2) to the driver's side A-pillar (7) of an automobile. Alternatively, or additionally, attachment means (1) may also affix the base member (2) to the windshield (8). In a preferred embodiment, the base member (2) is elongated in the direction parallel to the A-pillar (7) and may be substantially rectangular in shape. The base member may be made of any magnetic metal and suitable for use with the magnetic connector (3) chosen.

The magnetic connector (3) comprises a small flat magnet which is attached to a visor panel mounting support member (4) either mechanically or magnetically. The magnetic connector (3) attaches magnetically to the base member (2) and may be moved along the length of the base member (2) to adjust its vertical position relative to the A-pillar.

As will be apparent to one skilled in the art, the relative position of the support member (4) to the base member (2) determines the vertical position of the glare visor (6). The magnetic connector may be disposed between support member (4) and the base member, or on either side of the base member and support member. The present invention includes any configuration where the support member (4) is affixed to the base member (2) by magnetic means, where the support member can be conveniently mounted, demounted and adjusted by the user.

The glare visor (6) may be attached directly to the support member (4) or may be attached by means of an adjustable arm (5). If used, the mounting arm (5) is affixed to the support member (4) and may preferably include a single or double ball joint (5A, 5B) to allow further adjustment according to user preference.

Figure 3:
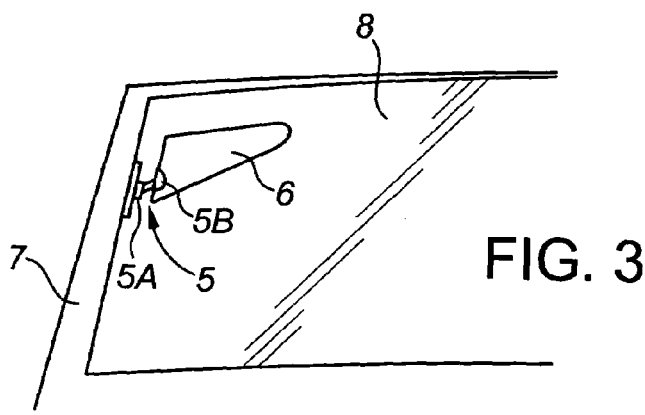
FIG. 3 is a view from the driver's perspective of the glare visor mounted to the A-pillar or the windshield of an automobile.

The glare visor (6) may be of any material having the property of assisting the reduction of glare experience by the driver of an automobile while simultaneously having the property of not unduly obstructing the vision of the driver or passenger of an automobile. Such materials are preferentially tinted and translucent plastic or glass. The glare visor (6) is shaped to block glare from the headlights of oncoming traffic from the driver's point of view. It is preferably elongate and has a shape substantially as shown in FIG. 3, which is roughly triangular, with a top edge that is slightly inclined upwards, about 10° to about 20°, and a left side edge which is substantially vertical. The bottom edge slants upwards to meet the top edge at the right side of the visor. The left and right sides may be reversed for right hand drive vehicles such as in Japan and Great Britain. This shape accounts for the parallax effect, where vehicles in the distance will appear smaller and more central in the driver's field of vision. Accordingly, the visor will be less intrusive in the central area of the driver's field of vision.

As will be apparent to those skilled in the art, various modifications, adaptations and variations of the foregoing specific disclosure can be made without departing from the scope of the invention claimed herein.

What is claimed is:

1. An auxiliary motor vehicle glare visor assembly comprising:
   a. an elongate base comprised of a magnetic material;
   b. attachment means for affixing the base to either or both of an A-pillar and a windshield of an automobile, such that the long side of the base member is substantially parallel to the A-pillar;
   c. a magnetic connector having a first and second side with the first side adapted to magnetically attach to a portion of the base member;

d. a visor support member affixed to the second side of the magnetic connector; and e. a glare visor attached to the support member;

whereby the operator may adjust the vertical location of the glare visor by movement of the magnetic connector lengthwise along the base or remove the glare visor by disengaging the magnetic connector from the elongate base.

2. The auxiliary motor vehicle glare visor of claim 1 wherein the visor is directly affixed to the glare visor support member.

3. The auxiliary motor vehicle glare visor of claim 1 wherein the glare visor is affixed to the support member with an adjustable arm.

4. The auxiliary motor vehicle glare visor of claim 3 wherein the adjustable arm comprise at least one ball joint.

5. The auxiliary motor vehicle glare visor of claim 4 wherein the attachment means comprises an adhesive, a hook and loop fastener or at least one suction cup.

6. The auxiliary motor vehicle glare visor of claim 1 wherein the glare visor has a vertical dimension and a horizontal dimension, and a side adjacent to the A-pillar and a side distal from the A-pillar, wherein the horizontal dimension is greater than the vertical dimension, and wherein the vertical dimension is greater at the side adjacent to the A-pillar than at the side distal from the A-pillar.

7. The auxiliary motor vehicle glare visor of claim 1 wherein the glare visor is shaped to cover a driver's parallax view of oncoming traffic.

8. The auxiliary motor vehicle glare visor of claim 7 wherein the glare visor is shaped substantially as a triangle, with a substantially vertical left side, an upper side angled upwards at about 10° to about 20°, and a lower side connecting the left side and the upper side.

* * * * *